(12) United States Patent
Kwon et al.

(10) Patent No.: US 9,563,306 B2
(45) Date of Patent: Feb. 7, 2017

(54) TOUCH SENSOR AND DISPLAY DEVICE INCLUDING THE SAME

(71) Applicants: Samsung Display Co., Ltd., Yongin, Gyeonggi-Do (KR); UNIST Academy—Industry Research Corporation, Ulsan (KR)

(72) Inventors: Junil Kwon, Yongin (KR); Jaejoon Kim, Ulsan (KR); Franklin Don Bien, Ulsan (KR); Hyunggun Ma, Ulsan (KR); Sanghyun Heo, Ulsan (KR)

(73) Assignees: Samsung Display Co., Ltd. (KR); UNIST Academy—Industry Research Corporation (KR)

( * ) Notice: Subject to any disclaimer, the term of this patent is extended or adjusted under 35 U.S.C. 154(b) by 0 days.

(21) Appl. No.: 14/849,250

(22) Filed: Sep. 9, 2015

(65) Prior Publication Data

US 2016/0124566 A1 May 5, 2016

(30) Foreign Application Priority Data

Nov. 4, 2014 (KR) .................. 10-2014-0152350

(51) Int. Cl.
*G06F 3/041* (2006.01)
*G06F 3/044* (2006.01)

(52) U.S. Cl.
CPC ............. *G06F 3/0416* (2013.01); *G06F 3/044* (2013.01); *G06F 2203/04104* (2013.01)

(58) Field of Classification Search
None
See application file for complete search history.

(56) References Cited

U.S. PATENT DOCUMENTS

| 7,812,827 | B2 | 10/2010 | Hotelling et al. |
| 2010/0328265 | A1 | 12/2010 | Hotelling et al. |
| 2012/0013546 | A1 | 1/2012 | Westhues et al. |
| 2013/0176274 | A1* | 7/2013 | Sobel ............... G06F 3/0416 345/174 |

FOREIGN PATENT DOCUMENTS

| JP | 4927216 | 2/2012 |
| KR | 10-2014-0010922 | 1/2014 |

* cited by examiner

*Primary Examiner* — Kent Chang
*Assistant Examiner* — Nathan Brittingham
(74) *Attorney, Agent, or Firm* — Innovation Counsel LLP

(57) ABSTRACT

Disclosed is a touch sensor, including: a plurality of driving electrodes; a plurality of detection electrodes positioned to cross the driving electrodes; and a driver configured to supply driving signals corresponding to driving codes to the driving electrodes, in which the driver supplies the same driving signal as that of a previous driving period to a corresponding driving electrode for a current driving period when the driving code is set to a first value, and supplies a driving signal different from that of the previous driving period to the corresponding driving electrode for the current driving period when the driving code is set to a second value.

11 Claims, 4 Drawing Sheets

TOUCH SENSOR AND DISPLAY DEVICE INCLUDING THE SAME

CROSS-REFERENCE TO RELATED APPLICATION

This application claims priority to and the benefit of Korean Patent Application No. 10-2014-0152350, filed on Nov. 4, 2014, in the Korean Intellectual Property Office, the entire contents of which are incorporated herein by reference in their entirety.

BACKGROUND

1. Field

The present disclosure relates to a capacitive touch sensor, and a display device including the same.

2. Description of the Related Art

Recently, a digitizer, a touch screen, and the like capable of replacing an existing input device, such as a keyboard and a mouse, by directly detecting a contact position of a hand of a person or an object have been widely utilized in devices.

These devices include a touch sensor for detecting a touch position. For example, a capacitive touch sensor, a resistive touch sensor, and an optical touch sensor may be used.

Among them, the capacitive touch sensor is capable of recognizing a touch position by detecting a point at which capacitance is changed by the contact of a hand of a person or an object. Some capacitive touch sensors that are able to detect multi-touch input and have high accuracy are being recently and widely used.

Referring to FIG. 1, the capacitive touch sensor may include driving electrodes 1 for receiving driving signals Vd1 to Vd4 and sensing electrodes 2 crossing the driving electrodes 1 to output detection signals Vout.

Recently, a driving method in which the driving signals Vd1 to Vd4 are simultaneously supplied to the driving electrodes 1 utilizing an orthogonal code (for example, a Walsh-Hadamard code), as illustrated in FIG. 2, has been suggested. Using this driving method, the detection signals Vout output from the respective detection electrodes 20 may have values corresponding to a sum of the driving signals Vd1 to Vd4. Accordingly, when there is no touch event, the detection signals Vout may be output in the form illustrated in FIG. 3.

However, as FIG. 3 shows for the method in the related art, the detection signals Vout for an initial period (0 to T) have values (V1 and −V1) unlike the other periods (a sum of the driving signals Vd1 to Vd4 is 0 during the remaining periods so that a predetermined minimum value is maintained). Because the detection signals Vout for the initial period (0 to T) have the values (V1 and −V1) in the initial period, the detection signals Vout may not be readily useable for detecting a touch event.

Accordingly, to use the detection signals Vout for the initial period (0 to T), an additional circuit may be separately provided to remove the values (V1 and −V1).

SUMMARY

An exemplary embodiment of the present system and method provides a touch sensor, including: a plurality of driving electrodes; a plurality of detection electrodes positioned to cross the driving electrodes; and a driver configured to supply driving signals corresponding to driving codes to the driving electrodes, in which the driver supplies the same driving signal as that of a previous driving period to a corresponding driving electrode for a current driving period when the driving code is set to a first value, and supplies a driving signal different from that of the previous driving period to the corresponding driving electrode for the current driving period when the driving code is set to a second value.

The driving signals may include a first driving signal and a second driving signal.

When the driving code is set to the first value, and the first driving signal is supplied to the corresponding driving electrode for the previous driving period, the first driving signal may be supplied to the corresponding driving electrode for the current driving period.

When the driving code is set to the second value, and the first driving signal is supplied to the corresponding driving electrode for the previous driving period, the second driving signal may be supplied to the corresponding driving electrode for the current driving period.

The first driving signal and the second driving signal may have a reverse relationship.

The driving codes may form one code matrix.

Rows of the code matrix may correspond to the driving electrodes, respectively, and columns of the code matrix may correspond to the driving periods.

The code matrix may be the Hadamard matrix.

Each of the driving codes may be set to A or −A, A being a natural number.

A may be 1.

The driving electrodes and the detection electrodes may be formed of a transparent conductive material.

The driver may simultaneously supply the driving signals to the driving electrodes.

A display device according to an exemplary embodiment of the present system and method includes the touch sensor.

BRIEF DESCRIPTION OF THE DRAWINGS

Example embodiments are described hereinafter with reference to the accompanying drawings. The present system and method, however, may be embodied in different forms and are not limited to the embodiments set forth herein. Rather, these embodiments are provided to facilitate those of ordinary skill in the art in understanding the teachings of the present system and method.

In the drawing figures, dimensions may be exaggerated for clarity of illustration. When an element is referred to as being "between" two elements, it may be the only element between the two elements, or one or more intervening elements may also be present. Like reference numerals refer to like elements throughout.

DETAILED DESCRIPTION

Figure 1:
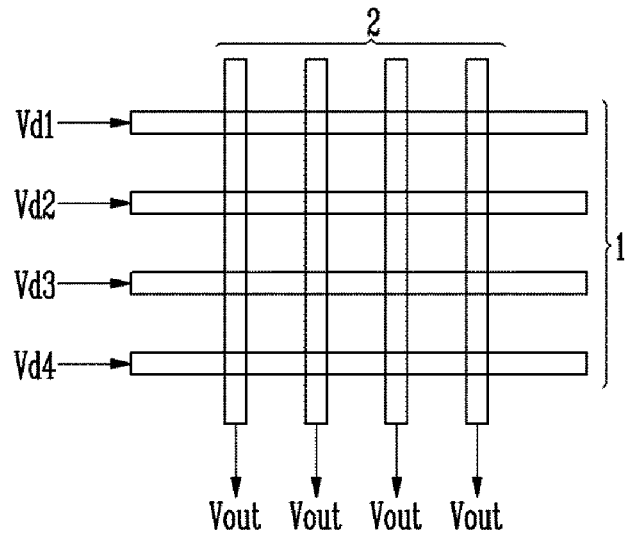
FIG. 1 is a diagram illustrating a touch sensor according to a related art.
Figure 2:
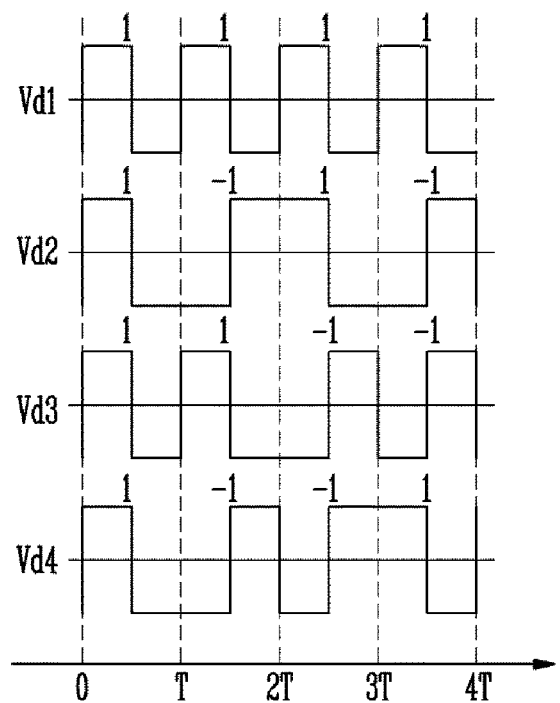
FIG. 2 is a diagram illustrating driving signals of the touch sensor illustrated in FIG. 1.
Figure 3:
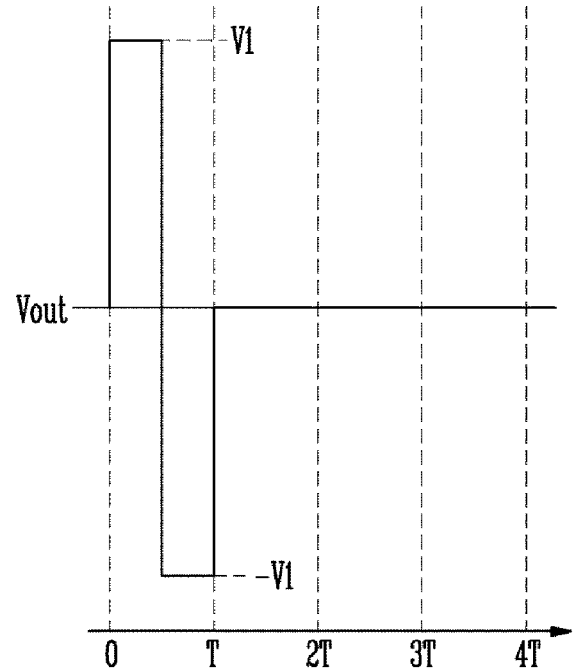
FIG. 3 is a diagram illustrating detection signals of the touch sensor illustrated in FIG. 1.

Although specific exemplary embodiments are illustrated in the drawings and described herein, the present system and method may have various modifications and encompass other exemplary embodiments. In other words, the present system and method are not limited to the specific embodiments disclosed herein. Accordingly, the spirit and technical scope of the present system and method include all modifications, equivalences, or substitutions of the exemplary embodiments disclosed herein.

In the description of respective drawings, similar reference numerals designate similar elements. In the drawings, the sizes of the structures are exaggerated for clarity. Terminologies such as "first" or "second" may be used to describe various components but the components are not limited by the above terminologies. The terms are used only to distinguish one constituent element from another constituent element. For example, without departing from the scope of the present system and method, a first constituent element may be referred to as a second constituent element, and similarly a second constituent element may be referred to as a first constituent element. Singular expressions used herein include plurals expressions unless indicated otherwise expressly or by the context of use.

In the present application, the terms "including" and "having" designate the existence of characteristics, numbers, steps, operations, constituent elements, and components described in the specification, or a combination thereof, and do not exclude the existence or addition of one or more other characteristics, numbers, steps, operations, constituent elements, and components, or a combination thereof. Further, when an element such as a layer, film, region, or substrate is referred to as being "beneath" another element, it may be directly beneath the other element, or intervening elements may also be present. Similarly, when an element such as a layer, film, region, or substrate is referred to as being "above" another element, it may be directly beneath the other element, or intervening elements may also be present.

Figure 4:
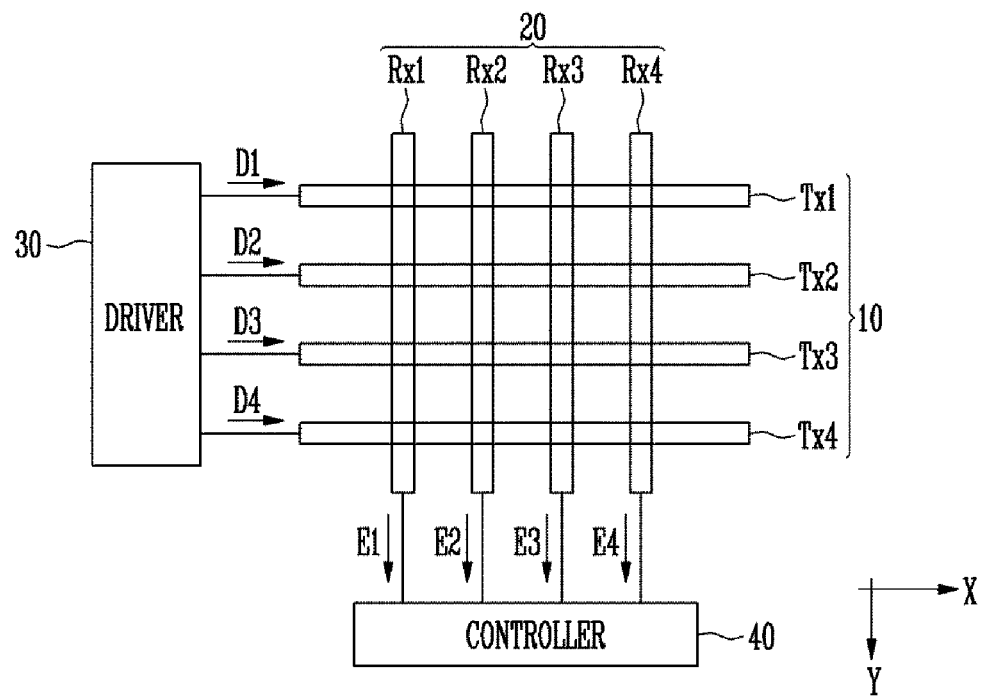
FIG. 4 is a diagram illustrating a touch sensor according to an exemplary embodiment of the present system and method.

FIG. 4 is a diagram illustrating a touch sensor according to an exemplary embodiment of the present system and method. Referring to FIG. 4, the touch sensor may include driving electrodes 10, detection electrodes 20, a driver 30, and a controller 40.

The plurality of driving electrodes 10 may be elongated in a first direction (for example, an x-axis direction) and arranged to be spaced apart in a second direction (for example, a y-axis direction) crossing the first direction. For example, the driving electrodes 10 may include first to fourth driving electrodes Tx1 to Tx4. That is, FIG. 4 illustrates the case in which there exist four driving electrodes Tx1 to Tx4. However, the number of driving electrodes 10 is not limited thereto, and may be varied.

The detection electrodes 20 may be spaced apart from the driving electrodes 10 and operate as a capacitive touch sensor together with the driving electrodes 10. Further, the detection electrodes 20 may be disposed to cross the driving electrodes 10.

The plurality of detection electrodes 20 may be elongated in the second direction (for example, the y-axis direction) and arranged to be spaced apart in the first direction (for example, the x-axis direction). For example, the detection electrodes 20 may include first to fourth detection electrodes Rx1 to Rx4. That is, FIG. 4 illustrates the case in which there exist four detection electrodes Rx1 to Rx4. However, the number of detection electrodes 20 is not limited thereto, and may be varied.

Due to the disposition of the driving electrodes 10 and the detection electrodes 20, mutual capacitance may be formed between the driving electrodes 10 and the detection electrodes 20 at points where the driving electrodes 10 and the detection electrodes 20 cross each other. Each crossing point at which the mutual capacitance is formed may operate as a detection cell.

The driving electrodes 10 and the detection electrodes 20 may be formed of a transparent conductive material, as well as other conductive materials, such as an opaque metal. For example, the driving electrodes 10 and the detection electrodes 20 may be formed of Indium Tin Oxide (ITO), an Indium Zinc Oxide (IZO), graphene, carbon nanotube, silver nanowires (AgNWs), and the like.

The driving electrodes 10 and the detection electrodes 20 may be positioned on the same layer or different layers. If the driving electrodes 10 and the detection electrodes 20 are positioned on the same layer, an insulation layer may be partially positioned at crossing regions of the driving electrodes 10 and the detection electrodes 20.

The driver 30 may supply driving signals D1 to D4 to the driving electrodes 10. For example, the driver 30 may simultaneously supply the driving signals D1 to D4 to the driving electrodes Tx1 to Tx4. Further, the driver 30 may output the driving signals D1 to D4 corresponding to predetermined driving codes.

The controller 40 may receive detection signals E1 to E4 output from the detection electrodes 20 and detect a touch event by using the detection signals E1 to E4. For example, the controller 40 may calculate a variation amount of the capacitance existing between the driving electrodes 10 and the detection electrodes 20 using the detection signals E1 to E4, and calculate a position of the touch event through the calculated variation amount.

Figure 5A:
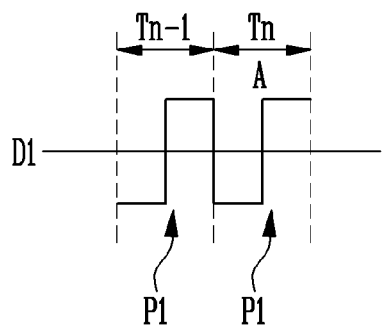
FIGS. 5A, 5B, 5C and 5D are waveform diagrams for describing an operation of a driver according to the exemplary embodiment of the present system and method.
Figure 5B:
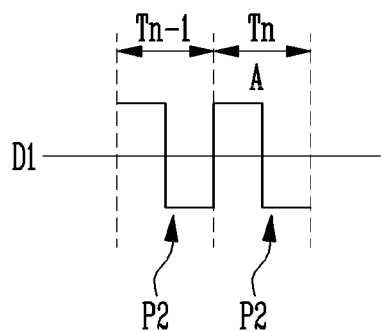
Figure 5C:
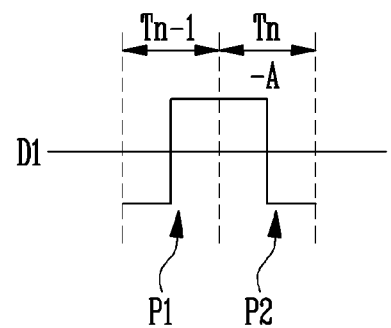
Figure 5D:
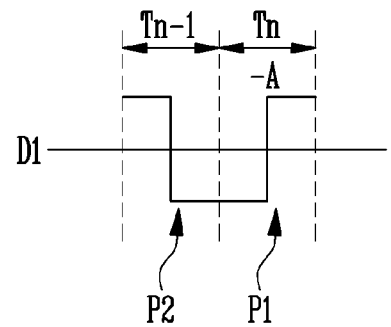

FIGS. 5A to 5D are waveform diagrams for describing an operation of a driver according to the exemplary embodiment of the present system and method. Particularly, FIGS. 5A to 5D representatively illustrate the driving signal D1 supplied to the first driving electrode Tx1. More particularly, FIGS. 5A and 5B illustrate the driving signal D1 when the driving code is set to A, and FIGS. 5C and 5D illustrate the driving signal D1 when the driving code is set to −A. According to an exemplary embodiment of the present system and method, the driver 30 may simultaneously supply the driving signals D1 to D4 corresponding to the driving codes (A and −A) to the driving electrodes 10.

A differential Manchester code may compare a transition state of a previous period and a transition state of a subsequent period, express "1" or high when the transition states of both periods are the same, and express "0" or low when the transition states of both periods are different from each other. For example, if both of the previous period and the subsequent period have a rising edge or a falling edge, the differential Manchester code may express "1" or high. Conversely, if any one period of the previous period and the subsequent period has the rising edge, and the remaining period has the falling edge, the differential Manchester code may express "0" or low.

According to an exemplary embodiment of the present system and method, the driver 30 may be operated as the aforementioned differential Manchester code. For example, when the driving code is set to A, the driver 30 may supply the same driving signal as that of the previous driving period to the corresponding driving electrode for the current driving period. On the other hand, when the driving code is set to −A, the driver 30 may supply a driving signal different from that of the previous driving period to the corresponding driving electrode for the current driving period.

An operation of the driver 30 according to an exemplary embodiment of the present system and method is described hereafter with reference to FIGS. 5A to 5D. However, for convenience of the description, the operation of the driver 30 is described based on the driving signal D1 supplied to the first driving electrode Tx1.

First, when the driving code is set to A, the driver 30 may supply the same driving signal as that of a previous driving period Tn−1 to the first driving electrode Tx1 for a current driving period Tn. For example, referring to FIG. 5A, when a first driving signal P1 is supplied to the first driving electrode Tx1 for the previous driving period Tn−1, the driver 30 may also supply the first driving signal P1 to the first driving electrode Tx1 for the current driving period Tn. That is, the driver 30 may supply the first driving signal P1 for the previous driving period Tn−1 and the current driving period Tn.

Similarly, referring to FIG. 5B, when a second driving signal P2 is supplied to the first driving electrode Tx1 for the previous driving period Tn−1, the driver 30 may also supply the second driving signal P2 to the first driving electrode Tx1 for the current driving period Tn. That is, the driver 30 may supply the second driving signal P2 for the previous driving period Tn−1 and the current driving period Tn.

On the other hand, when the driving code is set to −A, the driver 30 may supply a driving signal different from that of the previous driving period Tn−1 to the first driving electrode Tx1 for the current driving period Tn. For example, referring to FIG. 5C, when the first driving signal P1 is supplied to the first driving electrode Tx1 for the previous driving period Tn−1, the driver 30 may supply the second driving signal P2 to the first driving electrode Tx1 for the current driving period Tn. That is, the driver 30 may supply the first driving signal P1 for the previous driving period Tn−1 and the second driving signal P2 for the current driving period Tn.

Similarly, referring to FIG. 5D, when the second driving signal P2 is supplied to the first driving electrode Tx1 for the previous driving period Tn−1, the driver 30 may supply the first driving signal P1 to the first driving electrode Tx1 for the current driving period Tn. That is, the driver 30 may supply the second driving signal P1 for the previous driving period Tn−1 and the first driving signal P1 for the current driving period Tn.

Accordingly, driving code A may be expressed through the operation illustrated in FIGS. 5A and 5B, and driving code −A may be expressed through the operation illustrated in FIGS. 5C and 5D. Although only the driving signal D1 supplied to the first driving electrode Tx1 is described above, the operation of the driver 30 may be equally applied to the driving signals D2 to D4 supplied to the remaining driving electrodes Tx2 to Tx4.

Further, the first driving signal P1 and the second driving signal P2 may have a mutual reverse relationship. For example, the first driving signal P1 may be a signal that transitions from a low level to a high level, and the second driving signal P2 may be a signal that transitions from a high level to a low level, such as shown in FIGS. 5A to 5D. Accordingly, the first driving signal P1 may have a rising edge, and the second driving signal P2 may have a falling edge.

In FIGS. 5A to 5D, the signal having the rising edge is referred to as the first driving signal P1, and the signal having the falling edge is referred to as the second driving signal P2. These signals, however, are provided simply as examples. That is, the signal having the rising edge may be referred to as the second driving signal P2, and the signal having the falling edge may be referred to as the first driving signal P1.

As described above, the driving codes may be set to A and −A. The driving codes may form one code matrix. For example, the code matrix Cm may be expressed as follows.

$$Cm = \begin{bmatrix} A & A & A & A \\ A & -A & A & -A \\ A & A & -A & -A \\ A & -A & -A & A \end{bmatrix}$$

In this case, each row of the code matrix Cm may correspond to each of the driving electrodes Tx1 to Tx4, and each column of the code matrix Cm may correspond to each of the driving periods T1 to T4 (see FIG. 5).

Further, each of the elements in the first column and the first row of the code matrix Cm may be set to A. Further, the sum of the elements positioned in each of the remaining columns, except for the first column, may be set to 0, and the sum of elements positioned in each of the remaining rows, except for the first row, be set to 0.

Further, the code matrix Cm may be set to the Hadamard matrix in which each of the elements have a value of 1 or −1, and have orthogonality. That is, the value of A may be set to "1". In this case, the code matrix Cm may be expressed as follows.

$$Cm = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The operation of the driver 30 is described hereafter based on the case in which the code matrix Cm is set to the aforementioned Hadamard matrix.

Figure 6:
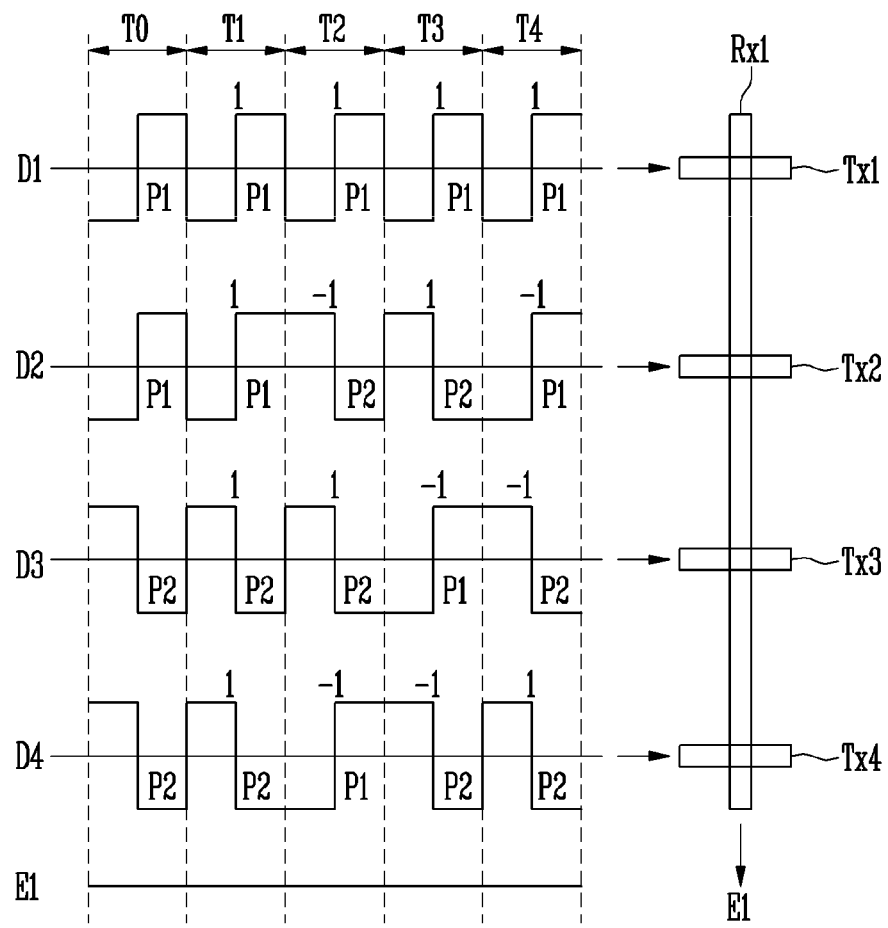
FIG. 6 is a waveform diagram for describing the operation of the driver according to the exemplary embodiment of the present system and method in more detail.

FIG. 6 is a waveform diagram for describing an operation of the driver according to an exemplary embodiment of the present system and method. Particularly, FIG. 6 illustrates the driving signals D1 to D4 supplied to the first to fourth driving electrodes Tx1 to Tx4. FIG. 6 also illustrates a detection signal E1 output from the first detection electrode Rx1 when there is no touch event.

First, the driver 30 may supply predetermined driving signals for an initial driving period T0 that occurs right before the first driving period T1, which may be used as a comparison with the driving signal supplied for the first driving period T1. For example, the driver 30 may supply the first driving signal P1 to the first driving electrode Tx1 and the second driving electrode Tx2, and the second driving signal P2 to the third driving electrode Tx3 and the fourth driving electrode Tx4 for the initial driving period T0.

That is, the driver 30 may divide the driving electrodes 10 into two groups having the same number of driving electrodes 10, and supply the first driving signal P1 and the second driving signal P2 to the two groups for the initial driving period T0, respectively. For example, when there exist 2n driving electrodes Tx1 to Tx2n, the driver 30 may supply the first driving signal P1 to n driving electrodes and the second driving signal P2 to the remaining n driving electrodes.

Since the driving code corresponding to the first driving electrode Tx1 for the first driving period T1 is 1, the driver 30 may supply the same first driving signal P1 as that of the initial driving period T0 to the first driving electrode Tx1 for the first driving period T1.

Since the driving code corresponding to the second driving electrode Tx2 for the first driving period T1 is 1, the driver 30 may supply the same first driving signal P1 as that of the initial driving period T0 to the second driving electrode Tx2 for the first driving period T1.

Since the driving code corresponding to the third driving electrode Tx3 for the first driving period T1 is 1, the driver 30 may supply the same second driving signal P2 as that of the initial driving period T0 to the third driving electrode Tx3 for the first driving period T1.

Since the driving code corresponding to the fourth driving electrode Tx4 for the first driving period T1 is 1, the driver 30 may supply the same second driving signal P2 as that of the initial driving period T0 to the fourth driving electrode Tx4 for the first driving period T1.

Since the driving code corresponding to the first driving electrode Tx1 for the second driving period T2 is 1, the driver 30 may supply the same first driving signal P1 as that of the first driving period T1 to the first driving electrode Tx1 for the second driving period T2.

Since the driving code corresponding to the second driving electrode Tx2 for the second driving period T2 is −1, the driver 30 may supply the second driving signal P2 different from that of the first driving period T1 to the second driving electrode Tx2 for the second driving period T2.

Since the driving code corresponding to the third driving electrode Tx3 for the second driving period T2 is 1, the driver 30 may supply the same second driving signal P2 as that of the first driving period T1 to the third driving electrode Tx3 for the second driving period T2.

Since the driving code corresponding to the fourth driving electrode Tx4 for the second driving period T2 is −1, the driver 30 may supply the first driving signal P1 different from that of the first driving period T1 to the fourth driving electrode Tx4 for the second driving period T2.

Since the driving code corresponding to the first driving electrode Tx1 for the third driving period T3 is 1, the driver 30 may supply the same first driving signal P1 as that of the second driving period T2 to the first driving electrode Tx1 for the third driving period T3.

Since the driving code corresponding to the second driving electrode Tx2 for the third driving period T3 is 1, the driver 30 may supply the same second driving signal P2 as that of the second driving period T2 to the second driving electrode Tx2 for the third driving period T3.

Since the driving code corresponding to the third driving electrode Tx3 for the third driving period T3 is −1, the driver 30 may supply the first driving signal P1 different from that of the second driving period T2 to the third driving electrode Tx3 for the third driving period T3.

Since the driving code corresponding to the fourth driving electrode Tx4 for the third driving period T3 is −1, the driver 30 may supply the second driving signal P2 different from that of the second driving period T2 to the fourth driving electrode Tx4 for the third driving period T3.

Since the driving code corresponding to the first driving electrode Tx1 for the fourth driving period T4 is 1, the driver 30 may supply the same first driving signal P1 as that of the third driving period T3 to the first driving electrode Tx1 for the fourth driving period T4.

Since the driving code corresponding to the second driving electrode Tx2 for the fourth driving period T4 is −1, the driver 30 may supply the first driving signal P1 different from that of the third driving period T3 to the second driving electrode Tx2 for the fourth driving period T4.

Since the driving code corresponding to the third driving electrode Tx3 for the fourth driving period T4 is −1, the driver 30 may supply the second driving signal P2 different from that of the third driving period T3 to the third driving electrode Tx3 for the fourth driving period T4.

Since the driving code corresponding to the fourth driving electrode Tx4 for the fourth driving period T4 is 1, the driver 30 may supply the same second driving signal P2 as that of the third driving period T3 to the fourth driving electrode Tx4 for the fourth driving period T4.

The detection signals E1 to E4 output from the detection electrodes Rx1 to Rx4, respectively, may have values corresponding to the sum of the driving signals D1 to D4 for each of the driving periods T0 to T4. Accordingly, the sum of the driving signals D1 to D4 for each of the driving period T0 to T4 has a predetermined value through the operation of the driver 30, and thus the detection signals E1 to E4 have predetermined minimum values (for example, 0) for all of the driving periods T0 to T4.

Although only the detection signal E1 output from the first detection electrode Rx1 is described above, but the operation of the driver 30 may be equally applied to the detection signals E2 to E4 output from the remaining detection electrodes Rx2 to Rx4.

By way of summation and review, according to exemplary embodiments of the present system and method, it is possible to provide a touch sensor in which the detection signals maintain predetermined values without the use of a separate circuit, and a display device including the same.

Example embodiments have been disclosed herein. Although specific terms are employed, they are used and to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, those of ordinary skill in the art would understand that various changes in form and details may be made without departing from the spirit and scope of the present system and method.

What is claimed is:

1. A touch sensor, comprising: a plurality of driving electrodes;
   a plurality of detection electrodes positioned to cross the driving electrodes; and
   a driver configured to supply driving signals corresponding to driving codes to the driving electrodes,
   wherein the driver supplies the same driving signal as that of a previous driving period to a corresponding driving electrode for a current driving period when the driving code is set to a first value, and supplies a driving signal different from that of the previous driving period to the corresponding driving electrode for the current driving period when the driving code is set to a second value;
   wherein the driving signals include a first driving signal and a second driving signal, and
   wherein when the driving code is set to the first value, and the first driving signal is supplied to the corresponding driving electrode for the previous driving period, the first driving signal is supplied to the corresponding driving electrode for the current driving period.

2. The touch sensor of claim 1, wherein when the driving code is set to the second value, and the first driving signal is supplied to the corresponding driving electrode for the previous driving period, the second driving signal is supplied to the corresponding driving electrode for the current driving period.

3. The touch sensor of claim 1, wherein the driving signals include a first driving signal and a second driving signal.

4. The touch sensor of claim 1, wherein the driving codes form one code matrix.

5. The touch sensor of claim 4, wherein rows of the code matrix correspond to the driving electrodes, respectively, and columns of the code matrix correspond to the driving periods, respectively.

6. The touch sensor of claim 4, wherein the code matrix is the Hadamard matrix.

7. The touch sensor of claim 4, wherein each of the driving codes is set to a value of A or −A, A being a natural number.

8. The touch sensor of claim 7, wherein the value of A is 1.

9. The touch sensor of claim 1, wherein the driving electrodes and the detection electrodes are formed of a transparent conductive material.

10. The touch sensor of claim 1, wherein the driver simultaneously supplies the driving signals to the driving electrodes.

11. A touch sensor, comprising:
a plurality of driving electrodes;
a plurality of detection electrodes positioned to cross the driving electrodes; and
a driver configured to supply driving signals corresponding to driving codes to the driving electrodes, wherein the driving signals include a first driving signal and a second driving signal that is an inverted signal of first driving signal,
wherein, during the initial driving period, the driver supplies the first driving signal to half of the driving electrodes and the second driving signal to the rest of the driving electrodes, and
wherein the driver supplies the same driving signal as that of a previous driving period to a corresponding driving electrode for a current driving period when the driving code is set to a first value, and supplies a driving signal different from that of the previous driving period to the corresponding driving electrode for the current driving period when the driving code is set to a second value.

* * * * *